United States Patent [19]
Roth

[11] Patent Number: 4,563,378
[45] Date of Patent: Jan. 7, 1986

[54] AUTOMOTIVE CARPET CONSTRUCTION AND METHOD OF MANUFACTURE THEREOF

[75] Inventor: David W. Roth, Grosse Pointe Park, Mich.

[73] Assignee: The 2500 Corporation, Birmingham, Mich.

[21] Appl. No.: 587,802

[22] Filed: Mar. 9, 1984

[51] Int. Cl.⁴ ............................................... B32B 3/02
[52] U.S. Cl. ........................................ 428/86; 156/72; 427/289; 427/299; 427/331; 428/96
[58] Field of Search ...................... 428/86, 96; 156/72; 427/289, 299, 331

[56] References Cited
U.S. PATENT DOCUMENTS

| | | | |
|---|---|---|---|
| 1,425,307 | 8/1922 | Wilson | 428/86 |
| 3,399,102 | 8/1968 | Matsushita | 428/86 |
| 4,364,331 | 12/1982 | Foenard | 428/86 |
| 4,404,243 | 9/1983 | Terpay | 428/86 |

Primary Examiner—Marion C. McCamish
Attorney, Agent, or Firm—Dolgorukov and Dolgorukov

[57] ABSTRACT

The specification discloses an improved automotive type carpet construction and method for manufacture thereof. The construction disclosed is particularly useful for lining the trunk of an automobile, the bed of an automotive type station wagon, or on the floor of a van type vehicle, where it is desired to have a construction which is light in weight, waterproof, easy to clean up, and yet can be made in a color to match the interior carpeting of the automobile. The construction disclosed has a primary layer of a ribbon fiber woven in a plain weave, with a continuous filament yarn inserted with a needled motion, and a bonding layer applied to the back thereof in a continuous hot melt flow. A non-skid layer may also be applied, if desired. The carpet construction is then die cut into one or more pieces with the piece(s) being sewn together or a binding being applied thereto.

31 Claims, 7 Drawing Figures

AUTOMOTIVE CARPET CONSTRUCTION AND METHOD OF MANUFACTURE THEREOF

The present invention concerns an automotive type carpet construction and method of manufacture thereof, and more particularly concerns a carpet construction which is suitable for use in a mat type form wherever a waterproof easily cleanable mat is needed, such as in the trunk of an automobile, the bed of a station wagon, or in a van, and is particularly useful where such mat must be light in weight and match the color of the interior carpeting of said vehicle.

It has been common practice in automotive vehicles to use carpeting in the luggage area of an automotive vehicle of the same color that is used in the interior of the vehicle. However, in order that such color match between the luggage area and interior of the motor vehicle can be achieved economically, it has been the practice to make the luggage area carpet of a less durable construction simply because it does not need to meet the severe everyday use standards which interior carpeting must meet.

In order to protect the bottom of the luggage area or trunk which is exposed to moderately severe use, as well as being exposed to the elements when wet objects are placed therein, it has been common to place a large, heavy, black rubber mat over the carpeting material to protect the floor of the trunk. However, these mats themselves are not very easy to clean, are not made in a variety of colors, and are usually supplied just in black, covering up a large part of the carpet and thus, defeating the matching of the trunk carpet with the interior carpet which was done for asthetic purposes.

In addition, these black rubber mats are very heavy and, with the increased concern about fuel economy, it has become desirable to provide a replacement for these mats in order to save weight and thus, increase fuel economy.

Thus, one of the objects of the present invention is to provide an improved automotive type carpet construction which can be used to replace the conventional trunk mat and be much lighter in weight.

Another object of the present invention is to provide an improved automotive carpet construction which can be manufactured into a trunk mat and is easily cleaned up should it be soiled.

Another object of the present invention is to provide an improved carpet construction of the foregoing nature which can be manufactured in virtually any color needed to match the interior carpet color of an automotive type vehicle.

Another object of the present invention is to provide an automotive type carpet construction of the foregoing nature which can be used to line the entire luggage area of an automotive type vehicle and still have the properties of being easily cleaned up and manufactured in a variety of colors.

A still further object of the present invention is to provide an improved automotive type carpet construction which can be used for lining the beds of station wagons, or the luggage areas of van type vehicles, or in virtually any other vehicle where a water impervious easily cleaned lining material is needed.

A still further object of the present invention is to provide an automotive type carpet construction of the foregoing nature which acts as a sound deadener.

A still further object of the present invention is to provide a method for manufacture of an automotive type carpet construction of the foregoing nature, whether in the form of a trunk mat or a liner material.

Another object of the present invention is to provide an improved automotive type carpet material which is relatively simple and inexpensive to manufacture.

Further objects and advantages of my invention will be apparent from the following description and appended claims, reference being had to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also it is to be understood that the phraseology and terminology employed herein is for the purpose of description and not of limitation.

Figure 1:
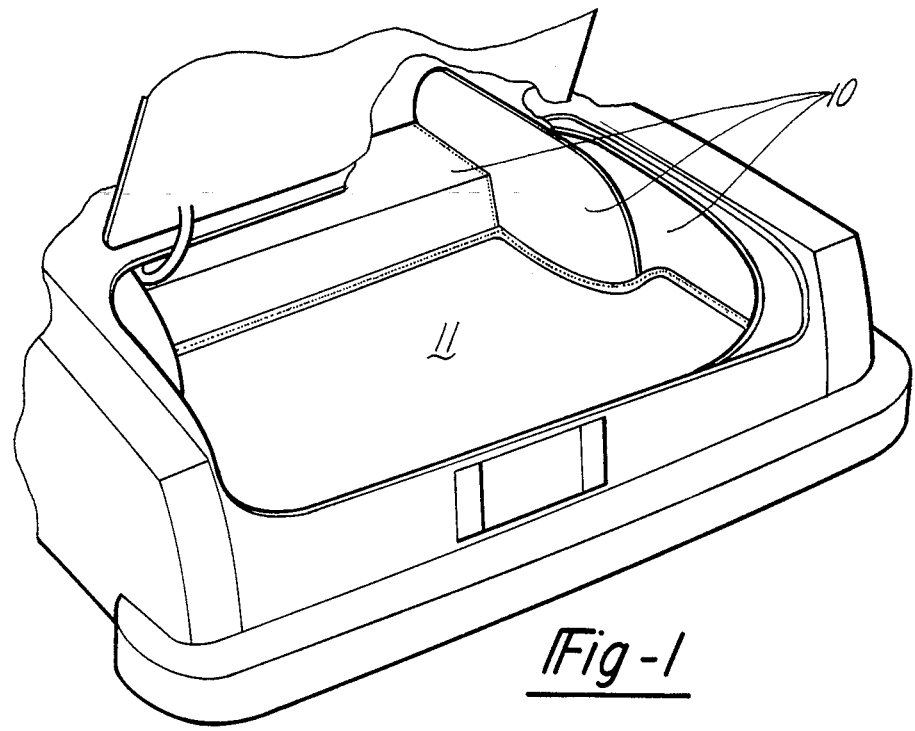
FIG. 1 is a perspective view showing a carpet construction embodying my invention lining the entire trunk floor of an automotive vehicle.

Referring to FIG. 1, there is shown a perspective view of a typical automotive trunk, lined with an automotive carpet type material 10 matching the color of the interior carpeting of the automotive vehicle as previously described, but having my improved carpet construction in the form of a trunk liner 11 applied thereto.

In a modification of my invention, instead of having the trunk liner 11 cover the entire floor of the automotive trunk 10, my improved construction is manufactured into a smaller trunk mat 12, having edge binding 13 applied to the perimeter thereof.

Before the present invention, the trunk, to the extent economically desirable for a particular car line, was typically finished with a carpet material of the same color which was used in the automotive interior, and because such carpet construction was less rugged than the interior carpet, a heavy, black rubber mat (not shown) was placed on the bottom of the trunk to take the major portion of the wear and abuse which would otherwise be directed to the carpet material.

This method of finishing the automotive trunk has posed several long standing problems in the art. First of all, rubber is not made in a large variety of colors, and while it is desirable to finish the automotive trunk in the same color as the interior of the automobile for asthetic purposes, this proved virtually impossible to do with rubber, or any other easily substitutable material, because of the nature thereof.

Also, while the primary purpose of having the rubber mat in the trunk was to protect the carpeting material and provide for easy clean up of water and other materials which might be found in the trunk, such as dirt, slush, snow, etc., it itself was not very easy to clean up after it aged for a year or so. For example, it typically would collect dirt in the crevasses of any design which was put in the trunk liner, it would stain from salt which might get on it, and as it aged and became drier, its glossy appearance tended to disappear. Thus, until my concern with the trunk lining material, the rubber mat in the trunk was a typical construction, but still suffered from long standing color match and clean up problems.

When weight became a factor, the rubber trunk mat became even more unsatisfactory because the rubber mat is very heavy and adds substantially to the weight of car for the small area it occupies. I, therefore, being one involved in product development for the automotive industry started looking at various possibilites for bringing the weight down of the rubber trunk mat, while at the same time solving the color match and clean up problems.

I at first thought if some new way could be found to color the rubber mat, I might solve at least one of the three problems present, and might also arrive at a new composition of rubber which might be light in weight. However, serious problems were encountered when attempting any solutions still involving the rubber mat. Any material I tried to substitute for rubber, such as substituting vinyl for rubber, still didn't solve any of the problems. Basically, I still had the same products with the same results. The expense of any substitution I tried proved to be too great, and made the solution economically unfeasible in the present day competitive automotive industry.

I also had the same trouble in matching the color of any substituted material to the color of automotive carpets, and was unable to find anything satifactory in this area.

In addition, the weight of the resultant mat was not reduced enough to make a significant weight saving. Thus, I abandoned my thought of modifying the prior art construction, and decided that a new approach was needed.

Because of my prior work in automotive carpets, as evidenced by my U.S. Pat. No. 4,361,610, issued Nov. 30, 1982, for a "Non-Skid Carpet Protector", and the work involved in the invention described and claimed in my currently pending patent application Ser. No. 444,986, for an "Improved Floor Mat Mounting System", I decided to look to the carpeting area for a possible new type of material, or new type of construction, to replace the automotive trunk mat. I initially came to this new approach because I knew carpeting was light in weight, and the possibility existed that the same carpet fiber could be used in the trunk liner 11 or trunk mat 12 as was used in the interior of the automobile, and thus a perfect color match might be obtained. Thus, two out of the three problems would be solved if a carpet construction could be used, but this still left the problem of clean up because, of course, what originally led me to try a variation of materials for the rubber trunk mat was the low durability of the typical trunk carpeting in severe applications.

I first tried making a standard carpet with a backing of a water resistant material to increase the durability of the carpet construction being used, but found that I still had a substantial clean-up problem because I had a carpet having a nap and pile like standard carpet which soiled just as easily as the standard material being used, and the provision of a water resistant backing still did not make the remainder of the carpet itself waterproof. Thus, this solution proved to be unsatisfactory.

Figure 2:
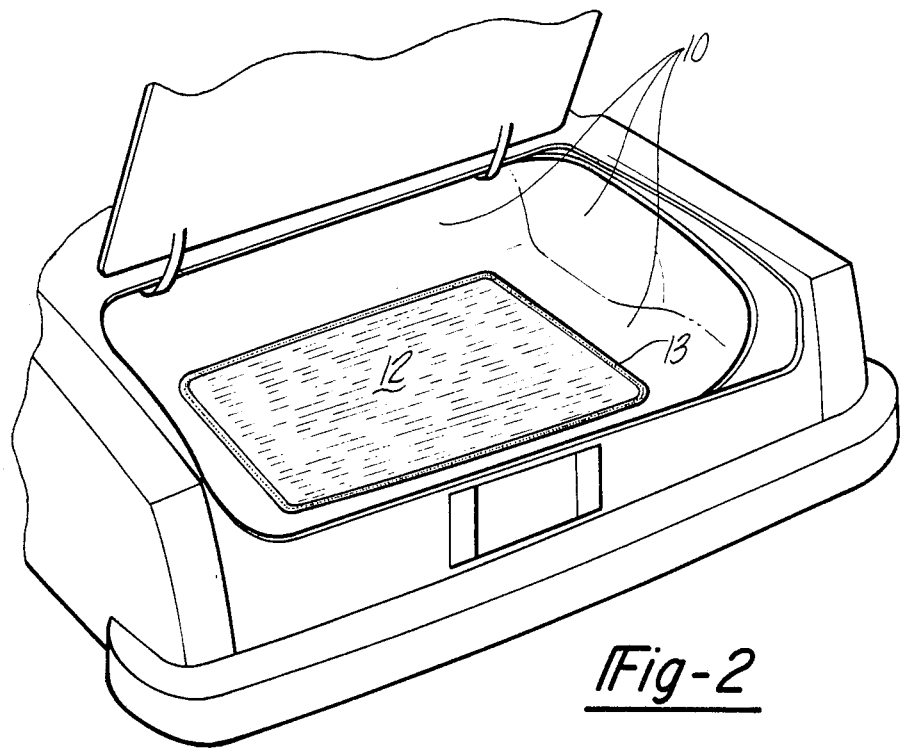
FIG. 2 is a perspective view showing a trunk mat embodying my construction being placed over the interior carpeting found in the typical automotive trunk.
Figure 7:
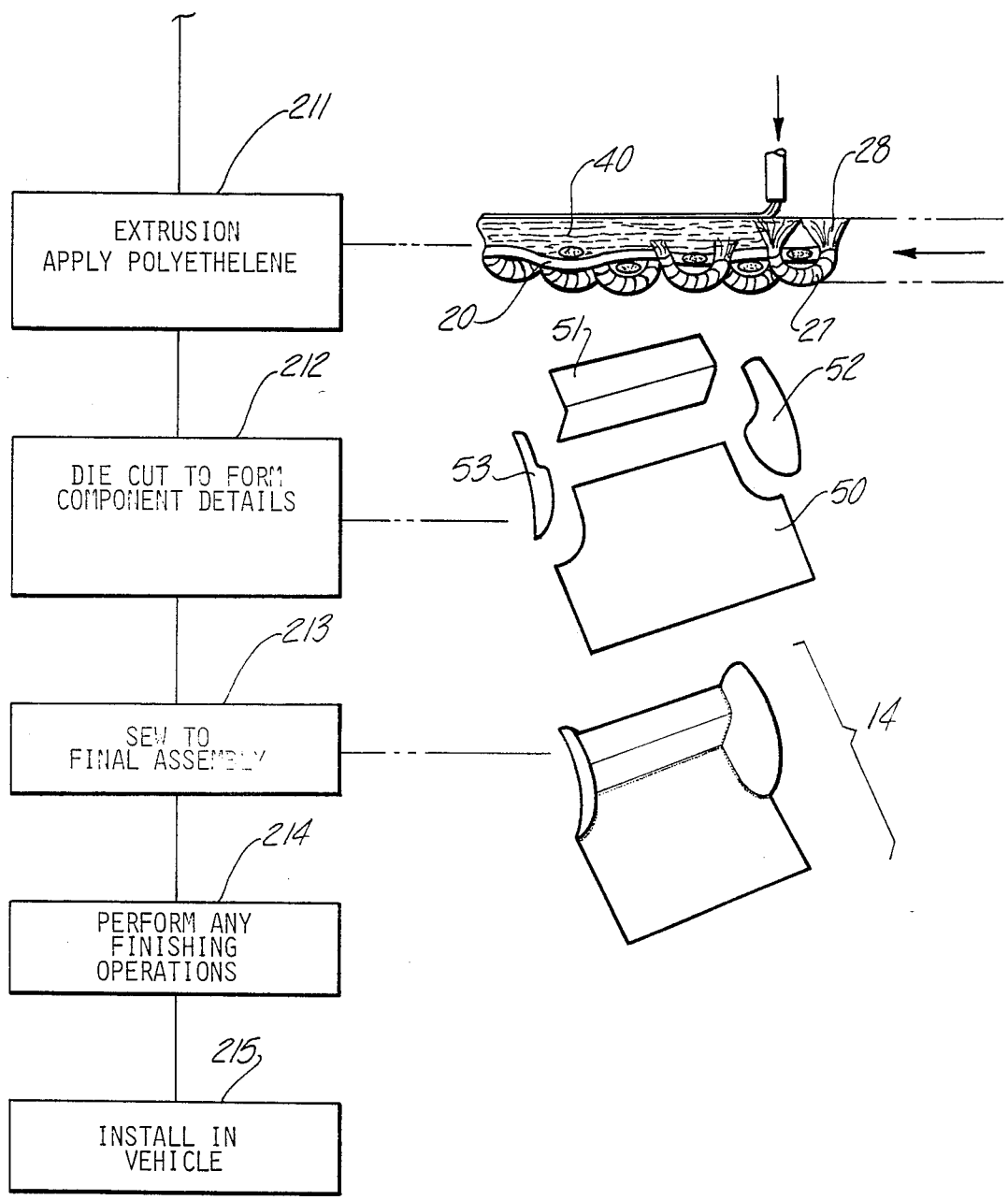
FIG. 7 is a diagrammatic view showing the additional steps used, after the steps shown in FIG. 4, in the manufacture of my improved carpet construction when it is desired to use my carpet construction to line the entire trunk area of an automotive vehicle.

After much experimentation, I arrived at a construction having a carpet backing of a water resistant material and having a carpet fiber also of a water resistant nature having only a very short loop exposed on the upper surface to eliminate the serious clean-up problems with long pile carpets. While a very short loop was exposed on the upper side of the carpet, below the carpet backing was a nonloop construction to which a variety of backing materials could be applied, with the added unexpected result that my carpet construction acted as a sound deadener because of the compression of the fibers during the application of the backing material. Thus, I had arrived at a construction which solved all three problems in the present day automotive art concerned with trunk lining constructions, i.e. that of weight, color match and clean-up, and one which could be used either in a trunk liner construction 11, as shown in FIG. 1, a trunk mat construction 12, as shown in FIG. 2, or which could be used to line the entire trunk area, as shown by the multi-piece liner 14 in FIG. 7.

Figure 3:
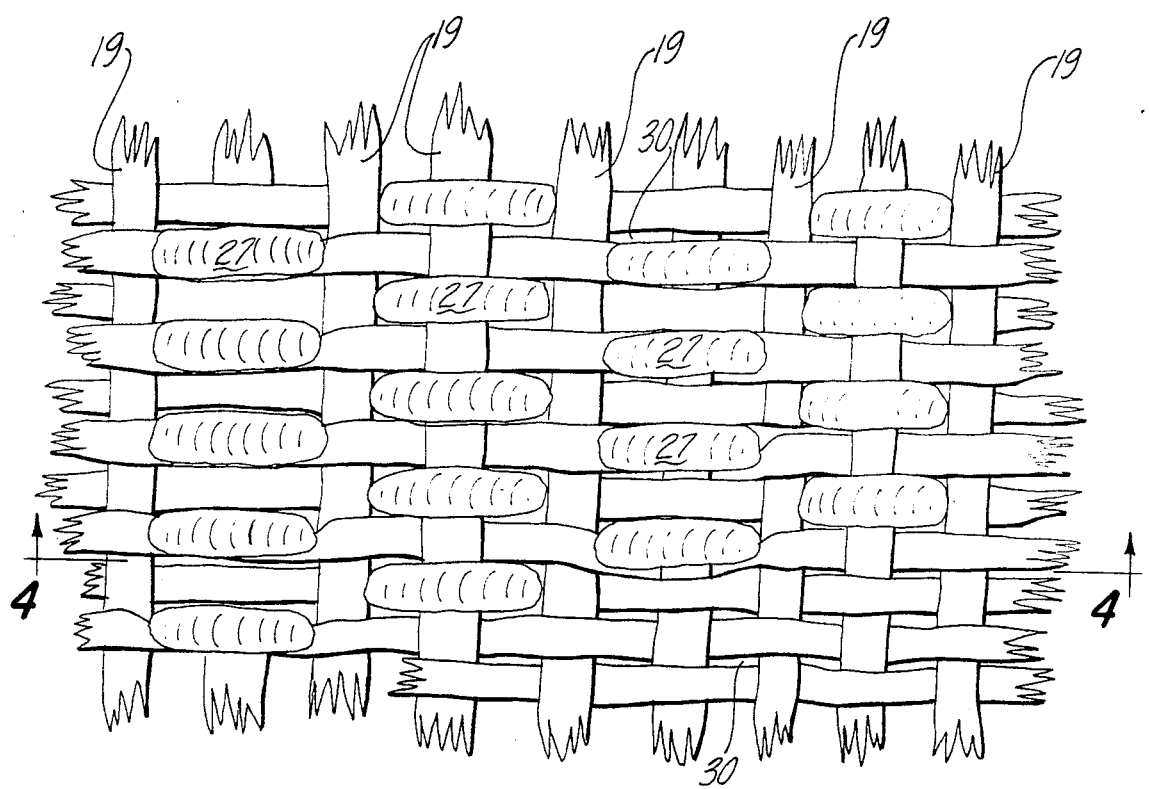
FIG. 3 is a fragmentary plan view of the construction shown in FIG. 1.
Figure 4:
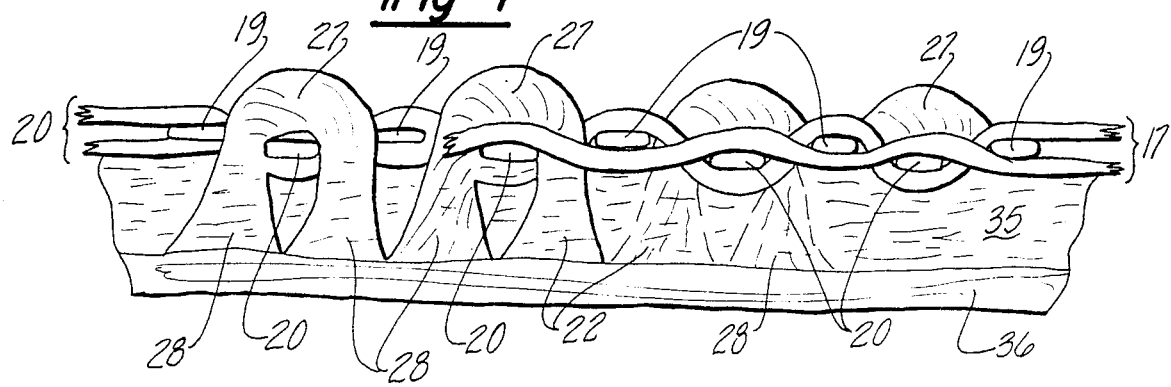
FIG. 4 is a sectional view taken in the direction of the arrows along the section line 4—4 shown in FIG. 3.

Referring now more particularly to FIGS. 3 and 4, it can be seen that my improved carpet construction basically starts a primary layer 17 which may be formed by strands of ribbon fiber 19 woven together in a plain weave to form what is known in the art as scrim 20. It should be understood that to make a waterproof construction, the ribbon fiber used in the weave should be of a water impervious construction and may be dyed to match the fiber to be inserted therein which will normally be the same color as the interior carpet of the automobile, but need not be. It should be understood that the other primary layers 17 may be found which are satisfactory, but the woven ribbon fiber is preferred. The scrim may have a warp of 24 strands per inch and a fill of 11 strands per inch, although a wide range of warp and fill are acceptable.

Figure 5:
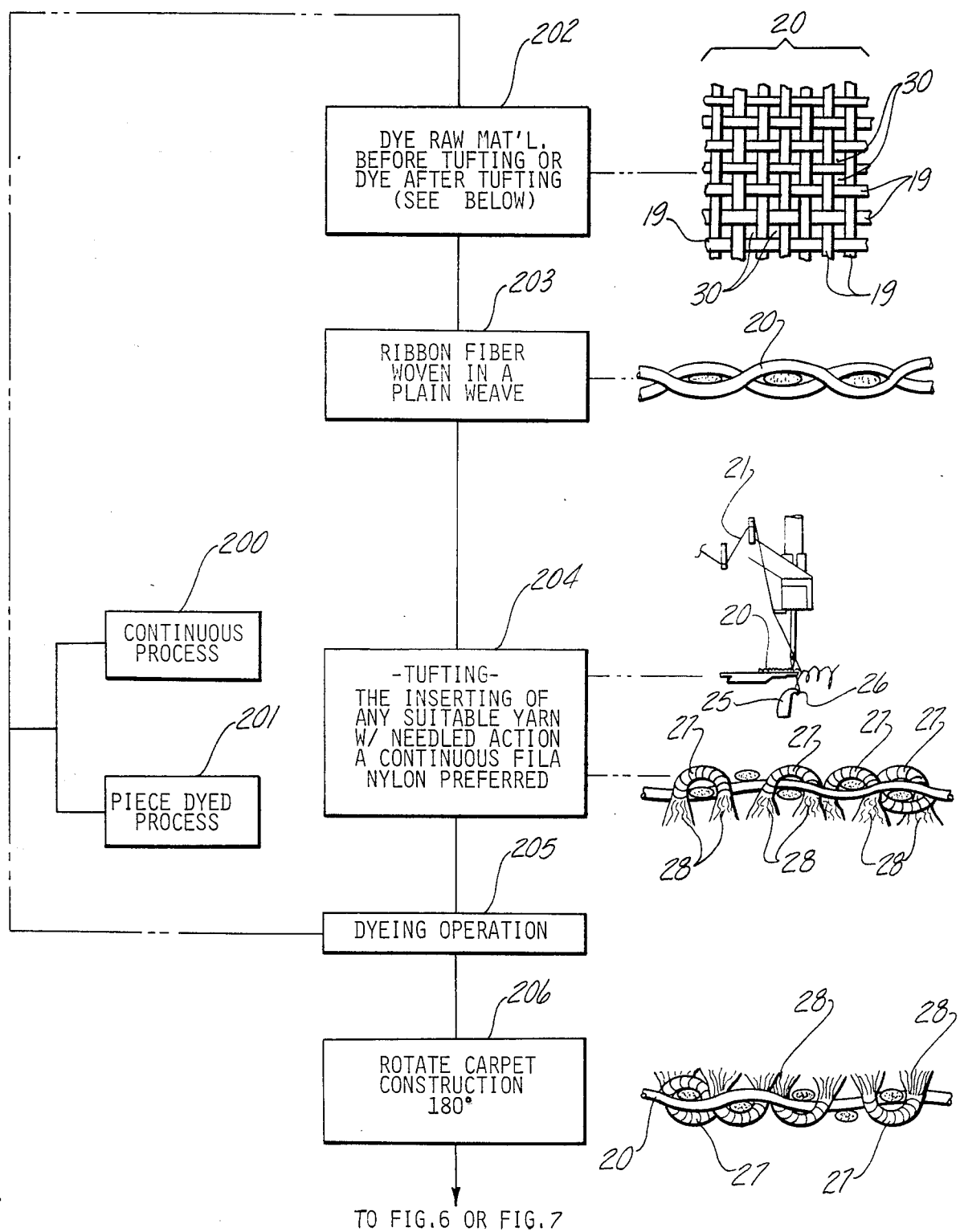
FIG. 5 is a diagrammatic view showing a series of steps used in the method of manufacture of my improved carpet construction.

Whether my improved carpet construction's final form is to be a trunk liner 11, a trunk mat 12, or a multi-piece liner 14, its construction starts out with several basic steps shown in FIG. 5.

Into the scrim there will be inserted, by tufting, yarn 21 having a preferred density of six to eight ounces per square yard, although a range of six to fifty ounces per square yard is usable. Since it is preferred that the color of the yarn match the color of the scrim, it is contemplated that these may be dyed separately before the tufting operation takes place or they may be dyed in a continuous dying operation after the tufting takes place. The dying may be either by a continuous process (block 200) or by a piece-dying process (block 201). If this is done before the tufting operation, it is indicated at block 202, and the dyed ribbon fiber is woven in a plain weave (block 203) to form the scrim 20.

The tufting operation (block 204) is nothing more than the inserting of any suitable yarn with a needling action. I prefer the tufting to take place at the rate of five stitches per inch with a range of five to nine stitches per inch being acceptable for automotive applications. For other applications of my carpet construction, a range of four to twenty-four stitches per inch can be used. For further information on how this takes place, a good reference work to consult is the Man Made Fiber and Textile Dictionary, published by the Celenese Corporation.

A diagrammatic view of the operation appears next to block 204 and involves the yarn 21 being inserted into the scrim 20 in a looping fashion with the loop being pulled through the scrim by aid of member 25. Because the member 25 has a knife edge 26, after the loop is pulled through the scrim, it is cut by the knife edge 26 to form the plurality of vertical loops 27, having severed lower ends 28 filling the interstices 30 in the scrim 20.

As mentioned before, if the scrim 20 and yarn 21 are to be dyed after the tufting operation, this may take place either by the continuous process (block 200) or the piece dyed process (block 201) as indicated at block 205.

The next step in the method of manufacture of my improved carpet construction is to rotate the carpet construction 180° to have the severed ends 28 of the vertical loops 27 now appear on the upper side of the scrim 20.

Figure 6:
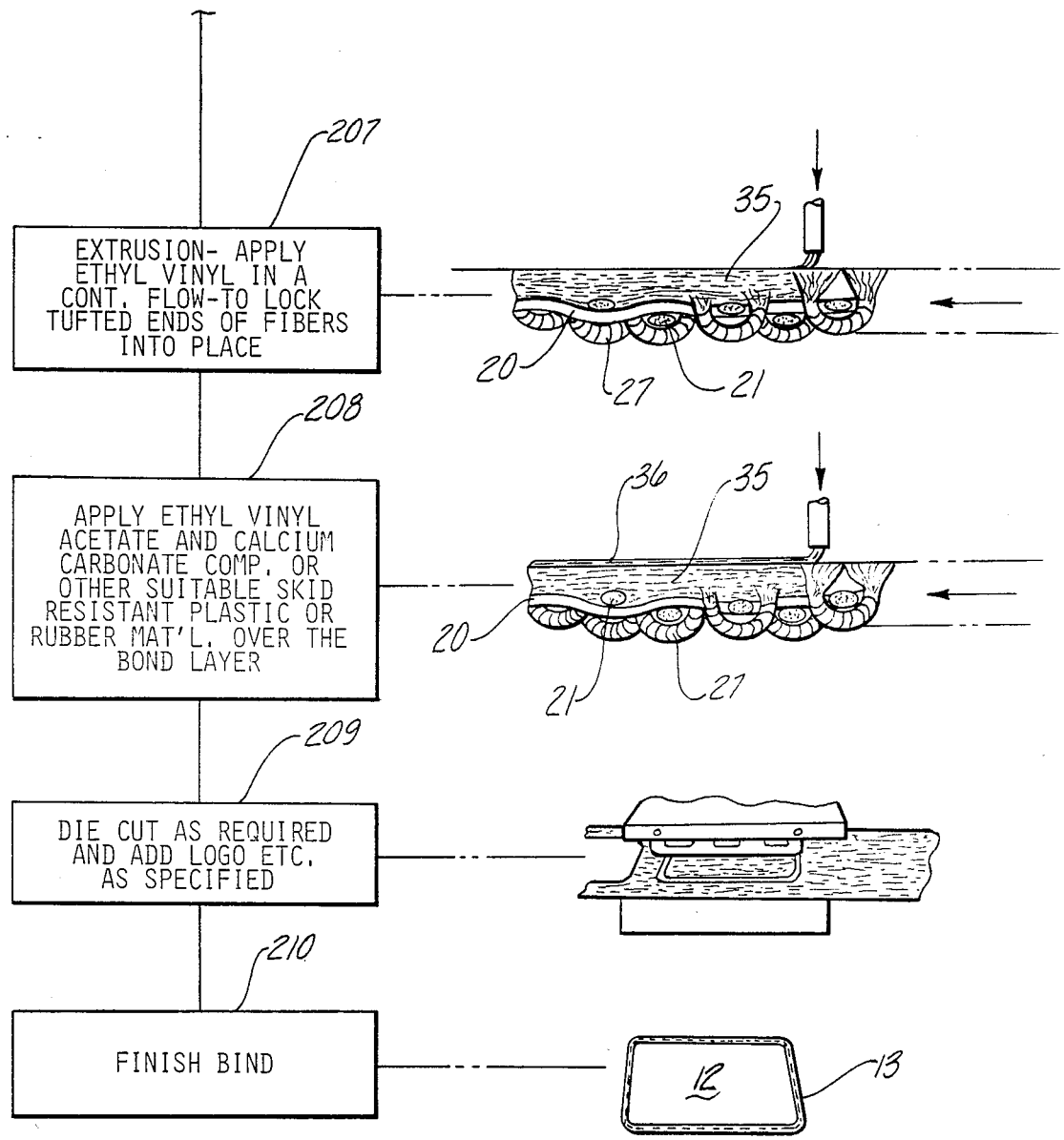
FIG. 6 is a diagrammatic view showing the additional steps used in the manufacture of my improved carpet construction when it is desired that the final form of such construction be a trunk mat or a floor liner.

As mentioned above, the steps to be taken at this point in the manufacture of my carpet construction depend on whether the final product is to be a trunk liner 11, a trunk mat 12, or a multi-piece liner 14. If the final form of my construction is to be the trunk liner or trunk mat, the additional steps shown in FIG. 6 are necessary.

If the final construction is to be the trunk liner or trunk mat, a non-skid lower surface is desired, and the next step (block 207) is to apply a non-skid lower backing material to what is now the upper side of the construction in a continuous hot melt process.

In the first stage of the two-stage application of the of the non-skid layer, a continuous hot flow of 100% ethyl vinyl acetate is applied in a manner well known in the art to entirely cover the severed ends 28.

It should be understood that ethyl vinyl accetate, also referred to as EVA or ethylene vinyl acetate, is a highly filled thermo plastic composition based on ethylene inner polymers and processing oils.

The ethyl vinyl acetate is preferably applied at a rate of approximately three pounds per square foot to provide a bonding layer 35.

On top of the binding layer 35 is applied a non-skid layer 36 consisting of a combination of ethyl vinyl acetate and calcium carbonate or other suitable skid resistant plastic or rubber material which can suitably bind itself to the ethyl vinyl acetate used in the bonding layer 35.

The next operation (block 209) is to dye cut the carpet construction to its final shape, whether this be the trunk liner 11, or the trunk mat 12. It should be understood that in addition to these two basic types of shapes, my carpet construction can be cut to any practicable shape depending upon the particular end use to which it is being put.

After the die cutting operation takes place, by a method well known in the art, an edge binding 13 is applied to form the final product, in this case the trunk mat 12 shown in FIG. 6.

If desired, the final form of my improved carpet construction can take the form of a multi-piece liner 14 or, indeed, any other practicable construction which could consist of several pieces of my improved carpet construction being sewn or otherwise joined together to form a construction similar to that designated by the numeral 14. Additional steps needed over those shown in FIG. 4 can be seen by referring to FIG. 7.

After my carpet construction is rotated 180° (block 206 - FIG. 5), a hot melt polyethylene bonding layer 40 is applied to what is now the upper side of the carpet construction to bind the severed ends 28 of the vertical loops 27 in a permanent fashion. Since the multi-piece construction is in this instance to be permanently mounted in the trunk of the automobile by other suitable means, the non-skid properties of the non-skid layer 36 are not needed which eliminates the need for the ethyl vinyl acetate bonding layer 35 and the hot melt polyethylene bonding layer 40 well known in the art is applied. the polyethylene bonding layer 40 should cover the severed ends 28 entirely.

The next step (block 212) is to dye cut or otherwise cut the construction form thus far into component pieces such as the floor piece 50, the shelf liner 51, and the right and left wheel well covers 52 and 53.

After this step, the various pieces are joined by any practicable means known in the art to form the final assembly. Under current practices (block 213), the pieces are normally sewn together to form the final assembly. In this case, the multipiece liner indicated by the numeral 14.

It should be understood, that any of the operations shown from block 212 to block 215 are well known in the art and need not be described in detail. Additional steps past block 213 include performing any finishing operations (block 214) and then installing the multi-piece liner in the automotive trunk (block 215) by any suitable means.

It should also be understood that although I have shown the steps necessary to manufacture a multi-piece liner for a trunk of an automobile, as previously explained similar steps can be used to manufacture many types, sizes and shapes of liners for use in a large variety of vehicles, such as boats, vans, campers, motor homes, etc., and still be within the scope of the present invention.

For ease of understanding of the construction of the product produced by the methods just described, one may again refer to FIGS. 3 and 4 where a construction having a non-skid backing is illustrated on a larger scale. A plan view of such a construction is shown in FIG. 3 where the scrim 20 formed from the individual ribbon fibers 19 is shown with a plurality of vertical loops inserted in the interstices 30 between the ribbon fibers 19.

An elevational view of the construction shown in FIG. 3 is shown immediately below in FIG. 4. As can be seen, the scrim 20 formed by the individual ribbon fibers 19 is shown having the plurality of vertical loops 27 inserted in the interstices of the scrim 20 and having the severed ends 28 of the vertical loops 27 locked in a ethyl vinyl acetate bonding layer 35.

Below the 100% ethyl vinyl acetate bonding layer, is a non-skid layer 36 composed of a combination of ethyl vinyl acetate and calcium carbonate.

Thus, by abandoning rubber mat type constructions and turning to a carpet type construction, I have invented a novel carpet construction which has solved a long standing problem in the automotive industry by providing a light weight trunk mat or liner which can be matched to the interior color of the vehicle, and has the strength and durability to withstand severe use, such carpet construction also being usable in related fields such as boating and any other field where the properties of my invention will be beneficial.

I claim:

1. An improved carpet construction including in combination:
   (a) a primary layer;
   (b) a plurality of vertical loops tufted into said primary layer and having severed ends extending below said primary layer; and
   (c) a bonding layer below and in intimate contact with said primary layer completely covering said severed ends and thereby embedding said severed ends therein.

2. The construction defined in claim 1, wherein said bonding layer is of a polyethylene material.

3. The construction defined in claim 2, wherein said primary layer is of a cross weave construction having a warp in the range of 14–20, and a fill in the range of 12–18, cross strands per inch.

4. The construction defined in claim 3, wherein said plurality of vertical loops are formed of fibers having a density of from 6–50 ounces per square yard.

5. The construction defined in claim 4, wherein said tufting is in the range of from 4–24 stitches per inch.

6. The construction defined in claim 4, and adapted for use in automotive applications wherein said tufting is in the range of from 5–9 stitches per square inch.

7. The construction defined in any one of claims 1, 2 or 3, wherein said vertical loops are formed of a nylon fiber having a density in the range of from 6–20 ounces per square yard.

8. The construction defined in any one of claims 1, 2 or 3, wherein said vertical loops are formed of a polyester fiber.

9. The construction defined in any one of claims 1, 2 or 3, wherein said vertical loops are formed of a polypropylene 10. The construction defined in claim 1, wherein said bonding layer is composed of 100% ethylene vinyl acetate.

11. The construction defined in claim 10, and having a non-skid layer below, and intimate contact with, said bonding layer.

12. The construction defined in claim 11, wherein said non-skid layer is composed of a combination of ethylene vinyl acetate and calcium carbonate in usable ranges.

13. The construction defined in claim 12, wherein said primary layer is of a cross stitch construction having a warp in the range of 14–20, and a fill in the range of 12–18, cross strands per inch.

14. The construction defined in any one of claims 10–13, wherein said vertical loops are formed of fibers having a density of from 6–50 ounces per square yard.

15. The construction defined in any one of claims 10–13, wherein said vertical loops are formed of polyester fibers.

16. The device defined in claims 10–13, wherein said fibers are formed of polypropylene.

17. The construction defined in any one of claims 10–13, wherein said vertical loops are formed of a nylon fiber having a density range of from 6–20 ounces per square yard.

18. The construction defined in claim 17, wherein said tufting is in the range of 4–24 stitches per square inch.

19. The construction defined in claim 17, wherein said carpet construction is intended for use in the automotive field and said tufting is in the range of from 5–9 stitches per square inch.

20. A method of manufacturing a carpet construction including the steps of:
    (a) providing a primary carpet layer;
    (b) tufting into said primary layer with a needled action a continuous filament carpet fiber and severing the ends of the loops formed by said needled action;
    (c) dying the combination of the construction formed by the combination of the primary carpet layer and the continuous filament fiber;
    (d) rotating the construction formed by 180°; and
    (e) applying a bonding layer in intimate contact with said primary layer and covering said severed ends of said continuous filament fiber.

21. The method defined in claim 20, wherein said primary carpet layer consists of a plurality of ribbon fibers woven in a plain weave with interstices formed between said fibers.

22. The method defined in claim 21, and including the additional step of applying a non-skid layer in intimate contact with said bonding layer.

23. The method defined in claim 22, and including the additional steps of:
    (a) die cutting said carpet construction to a desired size and shape; and
    (b) applying edge binding to said dye cut construction.

24. A method of carpet construction including the steps of:
    (a) providing a predyed primary carpet layer;
    (b) tufting into said primary carpet layer with a needled motion, a continuous filament fiber predyed to match said primary layer, and severing the ends of the loops formed by said tufting;
    (c) rotating the carpet construction consisting of the combination of the predyed primary layer and the predyed continuous filament fiber by 180°; and
    (d) applying a bonding layer in intimate contact with said primary layer and covering said severed ends of said continuous filament fiber.

25. The method defined in claim 24, wherein said primary carpet layer consists of a plurality of ribbon fibers woven in a plain weave with interstices formed between said fibers.

26. The method defined in claim 25, and including the additional step of applying a non-skid layer in intimate contact with said bonding layer.

27. The method defined in claim 26, and including the additional steps of:
    (a) die cutting said carpet construction to a desired size and shape; and
    (b) applying edge binding to said dye cut construction.

28. The method defined in any one of claims 23 or 27, wherein the step of applying a bonding layer in intimate contact with said primary layer includes the steps of applying a bonding layer comprised of 100% ethylene vinyl acetate.

29. The construction defined in claim 28, wherein the step of applying a non-skid layer includes the steps of applying a combination of ethylene vinyl acetate and calcium carbonate.

30. The method defined in any one of claims 20 or 24, wherein the step of applying a bonding layer includes the step of applying polyethylene in intimate contact both with said primary carpet layer and with said severed ends of said continuous filament nylon fiber.

31. The method defined in claim 30, and including the additional steps of:

(a) dye cutting said construction into one or more component parts;
(b) sewing said component parts together to form a final assembly;
(c) performing any desired finishing operations on said construction; and
(d) installing said construction in a motor vehicle.

* * * * *